2,752,091
Patented June 26, 1956

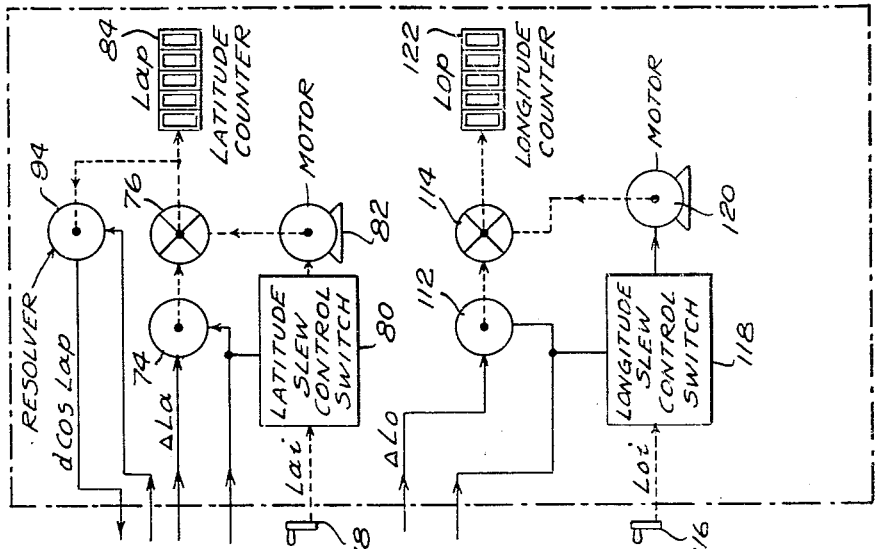
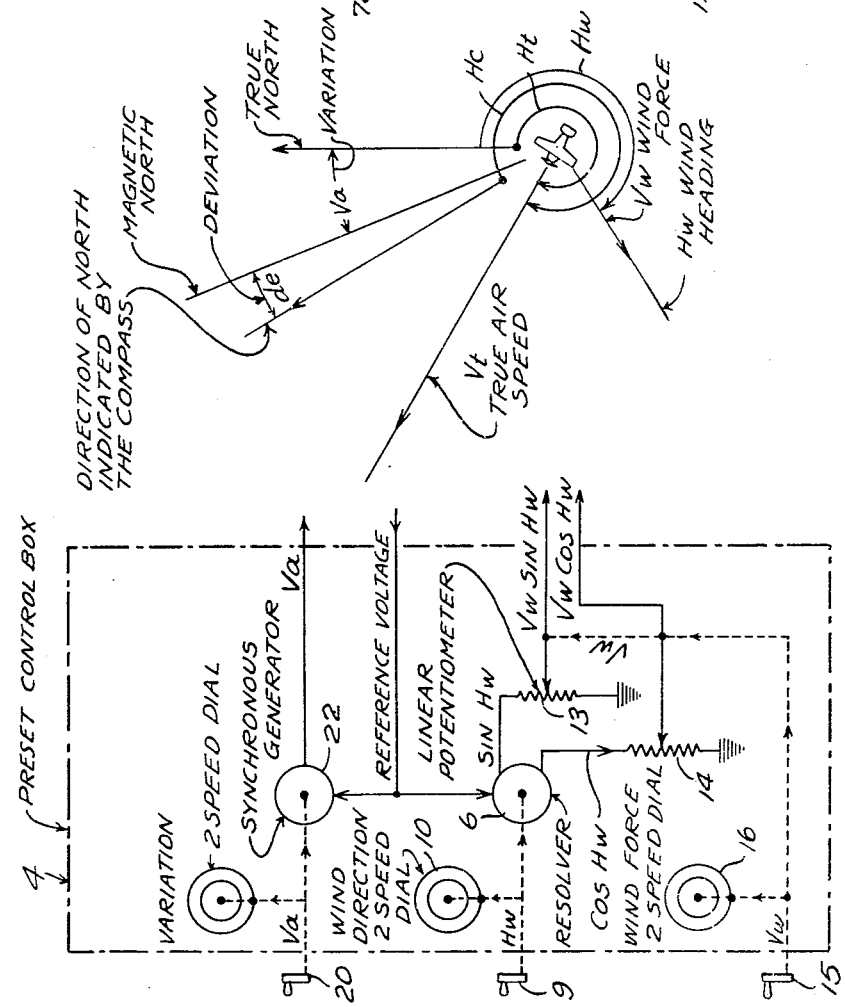

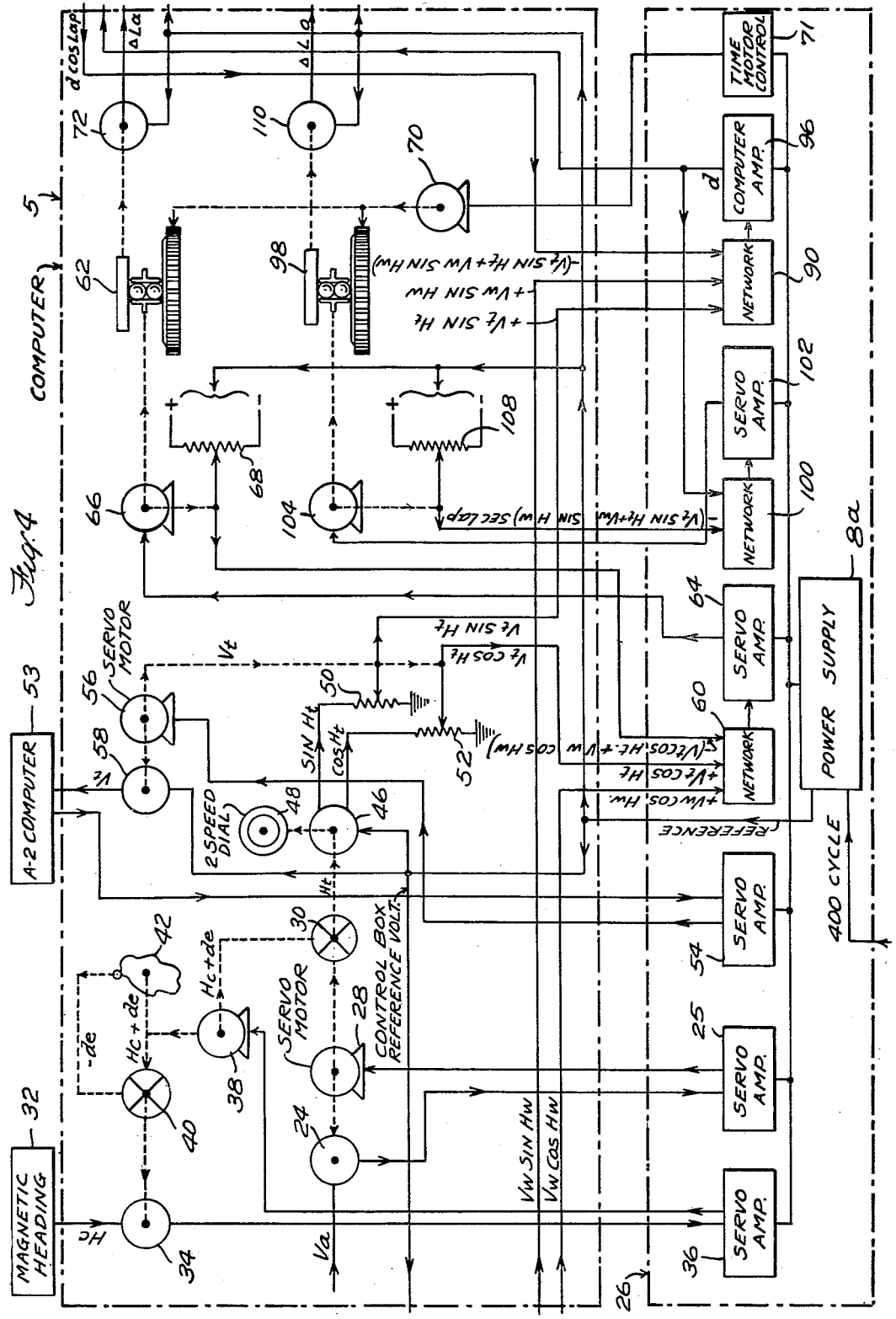

2,752,091

GROUND POSITION INDICATOR SYSTEM

Henry F. McKenney, Valley Stream, and George A. Lieske, Bayside, N. Y., assignors to Sperry Rand Corporation, a corporation of Delaware Application October 12, 1953, Serial No. 385,641

5 Claims. (Cl. 235—61)

This invention relates to a computer system which is adapted to obtain a continuous solution for the present latitude and longitude of an aircraft in flight.

According to the invention the computer system consists of a circuitry having standard units which are arranged to solve the following expression for present latitude:

$$Lap = Lai + K\int_0^t (Vt \cos Ht + Vw \cos Hw) dt$$

and to solve the following expression for present longitude:

$$Lop = Loi + K\int_0^t (Vt \cos Ht + Vw \sin Hw) \sec Lap \, dt$$

In the above formulation $Lai$ is initial latitude, $Loi$ initial longitude, and the integrals are latitudinal and longitudinal components respectively of the velocity of the airplane with respect to the ground. In point of fact the integral contains two velocities the sum of which is assumed ground speed. One velocity is airplane speed with respect to the air and the second in order of appearance is wind speed with respect to the ground. The limits of integration are the time elapsing over the distance traveled from initial ground position to computed ground position.

In solving these formulae, the computing system provides an air computer mechanism and circuits for automatically converting magnetic heading into true heading, resolving true air speed and wind force into latitudinal and longitudinal velocity components, converting for meridian convergence by means of a novel circuit arrangement, generating changes in latitude and longitude, combining initial values of latitude and longitude with the generated changes, and indicating present ground position in latitude and longitude.

The system has a high degree of accuracy between 70° N. and 70° S. latitude. Its efficiency falls off outside of these limits. The system has practical efficiency within wide limitations in every other respect.

It is an object of the invention to provide a computing system which yields solutions having a high order of accuracy which is made possible by the circuit arrangement particularly with respect to the method of introducing power to the servomechanism circuits, which include the summing networks for the velocity components, and also with regard to the method adapted for multiplying the resolver outputs. The use of resolvers and servo units are employed in the interest of accuracy although equivalent mechanism could be employed for the exclusive purpose of simplicity and economy of manufacture. Though not preferred such systems are deemed to be fundamental and entirely within the scope of discovered principles on which the embodiment shown and described herein is predicated.

Fig. 1 is a block diagram showing of the basic computer system;

Fig. 2 demonstrates a vectoral solution for resolving an airplane's true airspeed into its latitudinal and longitudinal components;

Fig. 3 is a schematic diagram of the pre-set control box;

Fig. 4 is a detailed view of the principal computer arrangement for the ground position indicator system in which the arrows indicate the direction of information, the lines being broken for mechanical and solid for electrical control;

Fig. 5 is a schematic diagram of the ground position indicator unit; and

Fig. 6 is a vector diagram showing all principal inputs including wind force and direction.

Figure 1:
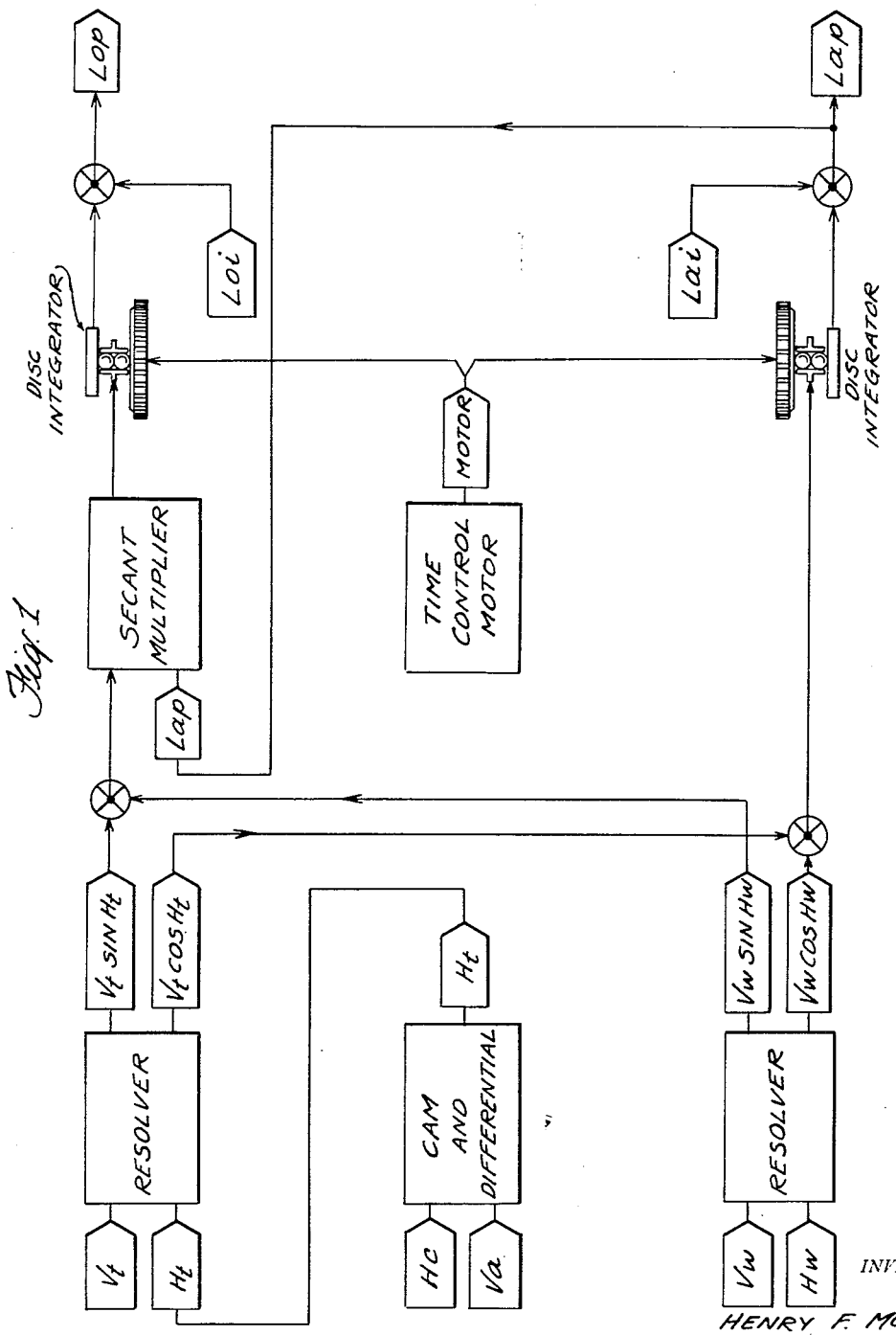
Figure 2:
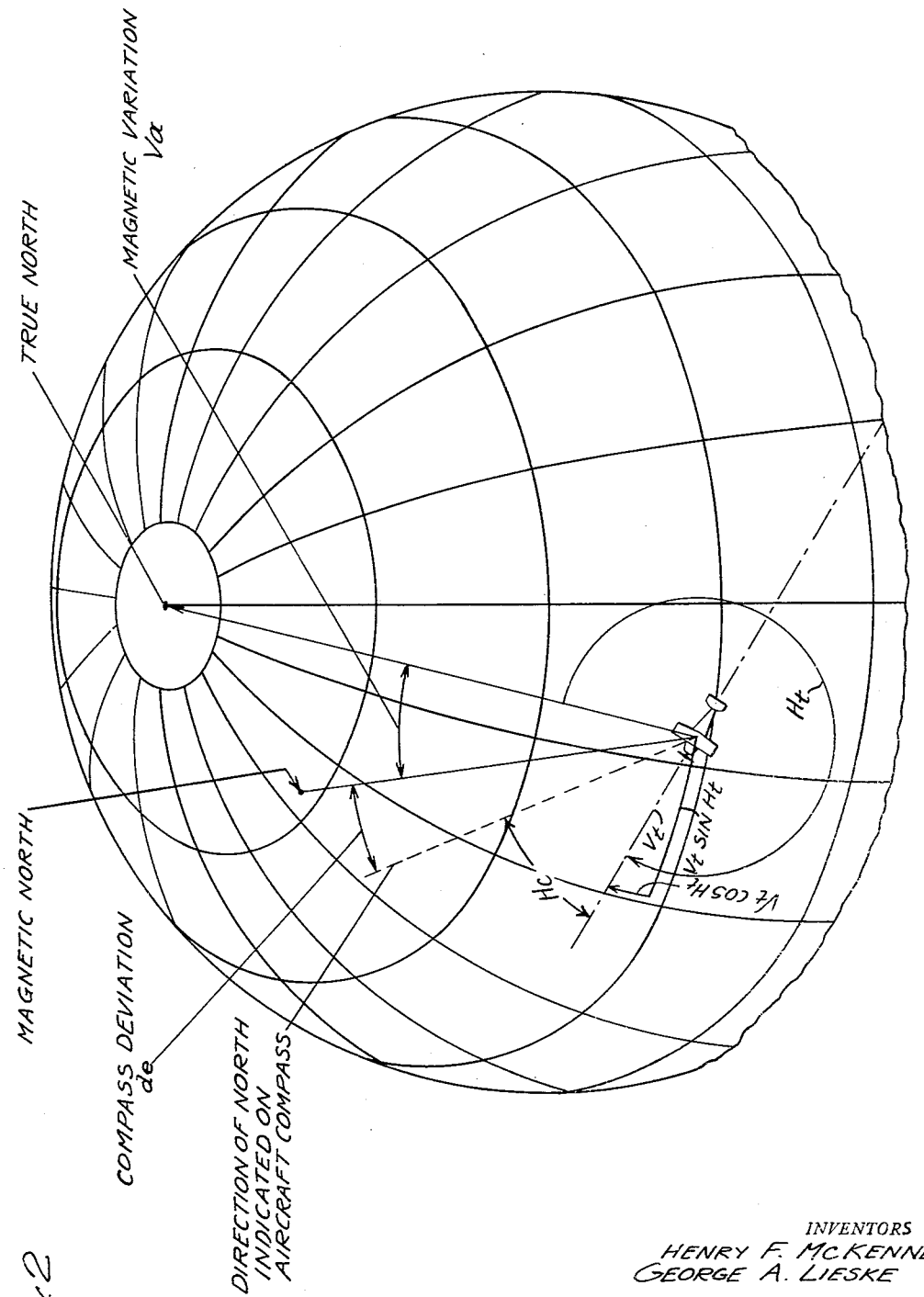

The ground position indicator system shown in Fig. 1 does not differ fundamentally from the preferred arrangement and is illustrative of the basic principles of operation. The principal differences are its method of power control, which except for the time control motor, is entirely mechanical. This system requires the same inputs and makes the same solutions as the system to be described. The obvious defects of the system reside in the time delay for making the calculations and the accuracy of the solutions.

Referring to Figs. 3 and 4 the pre-set control box contains instruments for resolving and introducing into computer 5 longitudinal and latitudinal components, of wind force $Vw$. These are $Vw \sin Hw$ and $Vw \cos Hw$, respectively, where $Hw$ is wind vector heading or the true direction toward which the wind is blowing. The resolution of wind force achieved by a sine and cosine resolver the stator winding of which is powered by a source of power $8a$ 115 volt 400 cycle reference voltage. The rotor of resolver 6 (Fig. 3) is positioned mechanically by pre-set wind heading knob 9, the wind direction being offset by 180° to obtain the wind vector direction $Hw$ which is indicated on course and vernier two speed dial 10. The outputs of resolver 6 are connected across two linear potentiometers 13 and 14 the shafts of which are driven by a known input quantity wind force ($Vw$), which is set in the pre-set control box by knob 15. An indication of $Vw$ is presented on course and vernier dial 16. A fraction of each resolver output voltage, proportion to $Vw$, is obtained from the potentiometers. The potentiometer, therefore, effectively multiply the resolver outputs, $\cos Hw$ and $\sin Hw$, obtaining component velocities $Vw \cos Hw$ and $Vw \sin Hw$.

Pre-set knob 20 introduces a correction factor $Va$ for magnetic variation. This is a known correction for the angle between the true north and magnetic north at any given place. This is a necessary quantity in the determination of true heading for the airplane and is introduced by means of knob 20 into the rotor of synchro generator 22 in the pre-set control box, from which it is relayed to the stator primary synchro control transformer 24 in the computer. A servo amplifier 25 in the amplifier unit 26 is connected in series with the rotor secondary of transformer 24. The amplifier 25 energizes servomotor 28 the output of which moves the rotor of synchro control transformer 24 to null its output when the motor armature has been driven as many turns as the quantity representing $Va$ requires. When the two inputs of transformer 24 are matched, there is no further output and servomotor 28 is no longer energized. It is thus insured that $Va$ is placed into one side of differential 30.

There is also introduced into differential 30 a quantity representing $Hc + de$ which, when added to $Va$, yields the true heading of the airplane $Ht$. $Hc$ is the heading of the plane as determined by the magnetic compass and $de$ is the deviation correction for residual deviations and inherent compass errors. The quantity $Hc$ is electrically set into the computer from a J-2 type compass or magnetic heading device 32. This quantity is impressed on synchro control transformer 34, the output of which is amplified by servo amplifier 36 which energizes servomotor 38. The output of motor 38 is placed on one side of differential 40 and deviation cam compensator 42 the surface contour of which is adjusted to yield corrections for the particular compass used. Deviation correction $de$ is introduced into differential 40 by a cam follower and gears not shown. The output of synchro control transformer 34 is nullified when the two inputs representing magnetic heading $Hc$ are matched. When the total of $Hc$ and $de$ is placed in the differential 40 by the reversible motor 38 the quantity $de$ is cancelled and only $Hc$ is yielded to the control transformer 34 thereby nullifying its output and deenergizing motor 38. The output of motor 38 is also introduced into differential 30. The sum of the inputs in this differential is the true heading $Ht$ of the aircraft.

True heading $Ht$ as an output of differential 30 is employed to drive the rotor of resolver 46 and is indicated on course and vernier dial 48. The output of the resolver 46 is sin $Ht$ and cos $Ht$. The linear potentiometers 50 and 52 are connected across the outputs in the same manner as are the potentiometers 13 and 14 connected to the output of resolver 6. The shafts of these potentiometers are driven by a quantity representing the true air speed of the aircraft $Vt$. The fractional output is proportional to the product of $Vt$ and the resolver functional outputs.

Current from amplifier 54 is received by servomotor 56 which has two mechanical outputs. One output drives the potentiometers 50 and 52 as explained. The second output is mechanically introduced into synchro generator 58 which is connected to the A-2 computer 53. When the electrical output of the synchro generator 58 matches the output of the computer 53, no further current is received by the amplifier 54 and the motor is stopped. At this point the servomotor output must be identical to the true air speed as determined by computer 53.

The latitudinal component of wind force $Vw \cos Hw$ is taken from the linear potentiometer 14 in the pre-set control box and introduced into summing network 60 with the output $Vt \cos Ht$ of potentiometer 52. To insure that the sum of these two components is accurately placed in integrator 62 the integrator input is fed back as a voltage to the network 60 for purposes of comparison. The servo arrangement is provided in the following manner. The output of network 60 is amplified by servo amplifier 64 which energizes servomotor 66. The output of motor 66 is introduced into ball and disc integrator 62 and also drives linear potentiometer 68 the end terminals of which have impressed therein a reference voltage supplied by the power supply. The fractional output of potentiometer 68 is fed back as a negative quantity into the network 60. Thus when this quantity matches the sum of the two inputs $Vw \cos Hw$ and $Vt \cos Ht$, motor 66 is stopped, and it is known that an accurate total of the two components is placed in the integrator 62.

The latitudinal distance traveled by the airplane is the time integral of the latitudinal velocity or:

$$\int_0^t (Vt \cos Ht + Vw \cos Hw) dt$$

Due to the nature of latitude, the change in latitude $La$ is directly proportional to this distance. Hence, by introducing the proportionality constant $K$ by a gear or ratio means not shown, $\Delta La$ is computed according to the relation:

$$\Delta La = K \int_0^t (Vt \cos Ht + Vw \cos Hw) dt$$

The above integral is computed by ball and disc integrator 62, having the advantages of high accuracy, ruggedness, and unlimited output. The integrator carriage is positioned by latitudinal velocity and its disc is rotated at constant speed by an accurately regulated time motor 70.

The required increment of latitude drives the rotor of synchro generator 72 the quantity being mechanically reproduced by synchro motor 74 (Fig. 5) and fed into one side of differential 76. Both the synchro generator 72 and synchro motor 74 have a reference voltage impressed thereon by the main power supply.

Initial latitude $Lai$ is also placed into the differential 76 by knob 78, latitude slew control switch 80 and motor 82. The differential output is the present value of latitude $Lap$ computed according to the equation $$Lap = Lai + La$$

This sum is mechanically placed into latitude counter 84. Counter 84 reverses when crossing the equator.

The longitude circuit closely resembles the latitude circuit. The principal difference resides in the means for introducing a value for the secant of the plane's latitude to compensate for meridian convergence. It has been determined that this convergence is proportional to the secant of the latitude. Therefore the change in longitude is governed by the following expression:

$$Lo = K \int_0^t (Vt \sin Ht + Vw \sin Hw) \sec Lap \, dt$$

Solution of the formula for $Lo$ is obtained in the following unique manner. As in the case of the latitude circuit, the longitudinal velocity components are taken from linear potentiometers. $Vt \sin Ht$ is set into a network box 90 (Fig. 4) by potentiometer 50 and $Vw \sin Hw$ is set into network box 90 by potentiometer 13 in the pre-set control box. The cosine of the present computed latitude is fed back into the network box 90 from cosine resolver 94 the rotor of which is driven by the output of differential 76 in the ground position indicator unit. The output of network box 90 is amplified by computing amplifier 96 which is connected to the primary of resolver 94. Because it is an adding network, the negative resolver feed back is equal to the sum of the two velocity inputs. Since the output of the resolver is a function of the voltage impressed on its primary and the cosine of the computed latitude, the primary voltage, which is supplied by the amplifier 96, must be such that when multiplied by cos $Lap$ the product equals the sum of the two velocity components inputs in the network box. If we assume this primary voltage to be $d$, then the following formulae are true:

$$Vw \sin Hw + Vt \sin Ht = d \cos lap$$

or $$d = (Vw \sin Hw + Vt \sin Ht) \sec lap$$

According to the invention the resolver primary voltage $d$ is therefore employed to position the carriage of longitudinal ball and disc integrator 98 whose disc is rotated at constant speed by the time motor 70. A servo circuit arrangement is adopted for this purpose similar to the driving connections for the latitude integrator 62. The voltage $d$ is introduced into adding network 100 the output current of which is amplified by servo amplifier 102 which energizes servomotor 104. The two mechanical outputs of motor 104 position the carriage of the integrator 98 and drive linear potentiometer 108 the end terminals of which have the reference voltage impressed thereon. The negative output of linear potentiometer 108 is fed back into the adding network 100. When the two inputs of adding network 100 match, the motor 104 is stopped, its shaft having been driven the required number of revolutions to insure that the quantity $(Vt \sin Ht + Vt \sin Hw) \sec Lap$ has been set in the integrator 98.

Integration of the velocity input multiplied by a proportional factor $K$ yields the desired longitudinal distance that the plane has traveled during the time $t$ from initial ground position in accordance with the expression for change in longitude given above. This increment is mechanically placed into synchro generator 110 and reproduced by synchro motor 112 connected therewith. It is then set into differential 114 which also receives a value for initial longitude $Loi$ from pre-set knob 116, longitude slew control switch 118 and motor 120. The reference voltage is the excitation for the synchro generator 110 and synchro motor 112 and powers the control switch 118.

The output of differential 114 is the sum of the known initial longitude and the computed increment of longitude according to the expression for present longitude Lop $$Lop = Loi + Lo$$

Present longitude Lop is read on the longitude counter 122 which is connected to the output of the differential 114. Counter 122 reverses when crossing the 0° or 180° meridian.

The computer system above described is merely illustrative of a preferred application of the basic computer system shown generally in Fig. 1. The described arrangement is preferred in the interest of speed and accuracy only, and is not intended to limit the invention which is defined by the appended claims.

What is claimed is:

1. A ground position indicator system comprising a resolver for computing sine functions, means for introducing wind direction into said resolver, means for multiplying the output of said resolver by a known value of wind force, a second sine resolver, means for computing a value for true heading including a synchro generator, means for mechanically introducing magnetic variation into said synchro generator, a synchro control transformer electrically responsive to said synchro generator, a servo amplifier electrically connected to said control transformer, a motor energized by said amplifier and mechanically connected to said synchro control transformer, a differential also connected to said motor by means of which a value for magnetic variation is introduced, a magnetic heading compass, a second synchro control transformer and servo amplifier electrically connected to said compass, a second servomotor powered by said amplifier, a deviation cam compensator mechanically connected to said second motor, a second differential connected to said second synchro control transformer, means for introducing the output of said second motor and deviation cam compensator into said first and second differentials, the output of the first differential then being the true heading, means for introducing the true heading into said second sine resolver, means for multiplying the output of said second sine resolver with a known value of true air speed, means for adding corresponding functional outputs from said resolvers, means for multiplying the added sine outputs by a quantity representing the secant of the computed latitude, an integrator, means for introducing the output of said last mentioned means and a time component into said integrator, longitude indicator means and means for introducing the output of said integrators into said indicator means.

2. A ground position indicator system comprising a resolver for computing sine and cosine functions for introducing wind direction into said resolver, means for multiplying the output of said resolver by a known value of wind force, a second sine and cosine resolver, means for introducing a value for true heading into said second resolver, means for multiplying the output of said second resolver by a known value of true air speed, means for adding the cosine components of air speed and wind force from said resolvers, a network for adding the sine components of air speed and wind force of said resolvers, a computing amplifier connected to said network, a cosine resolver, means for introducing the cosine of the computed latitude into said resolver, a wire connection between the amplifier and cosine resolver, a feed back connection between said resolver and said network, a second network one input terminal of which is connected to tap the said wire connection, a servo amplifier and servomotor connected to the output of said second network, a voltage source responsive to the output of said servomotor and connected as a feed back to a second input terminal of said second network, an integrator mechanically connected to said servomotor, a second integrator mechanically connected to the output of the cosine adding means, means for separately introducing the resulting sine and cosine quantities and a time component into said integrators, indicator means and means for introducing the output of said integrator into said indicator means.

3. A ground position indicator system as defined in claim 2 wherein the means for adding the cosine components of true air speed and wind force and introducing the total into its integrator comprises a network, means for introducing said components into the network, a servo amplifier connected to the output of said network, a servomotor connected to the servo amplifier, the output of said motor being introduced into one of the said integrators, a linear potentiometer the tap of which is driven by said motor, the center tap of which is connected to a feed back line to said network, and a power supply connected to the end terminals of said potentiometer.

4. A secant computer and a servo follow up system for insuring an accurate application of the output of said computer comprising an adding network, means for applying a voltage to said adding network, an amplifier connected to the output of said adding network, a cosine resolver connected to said amplifier, the output of said resolver being connected as a feed back to said adding network, a second adding network connected to the output of said amplifier, a servo amplifier connected to the output of said second adding network, a servomotor energized by said servo amplifier and a voltage source responsive to the output of said motor and connected as a feed back to said second adding network, the output of which is nullified when the last mentioned feed back current and the input current placed therein by the first mentioned amplifier are equal.

5. A secant computer and servo follow-up system as defined in claim 4 in which the voltage source responsive to the output of said servomotor is a linear potentiometer the shaft of which is driven by said servomotor and a power supply to impress a voltage on the end terminals of said linear potentiometer.

References Cited in the file of this patent

UNITED STATES PATENTS

| | | |
|---|---|---|
| 1,985,265 | Smith | Dec. 25, 1934 |
| 1,985,266 | Smith | Dec. 25, 1934 |
| 2,406,836 | Holden | Sept. 3, 1946 |
| 2,425,346 | Rippere | Aug. 12, 1947 |
| 2,428,770 | Albert | Oct. 14, 1947 |
| 2,434,270 | Holden | Jan. 13, 1948 |